(12) United States Patent
Meyer et al.

(10) Patent No.: US 7,285,330 B2
(45) Date of Patent: Oct. 23, 2007

(54) TEXTURE-COATED SILICA

(75) Inventors: Jürgen Meyer, Stockstadt (DE); Kurt Spitznagel, Hanau (DE); Hans-Dieter Christian, Alzenau (DE)

(73) Assignee: Degussa GmbH, Hanau (DE)

( * ) Notice: Subject to any disclaimer, the term of this patent is extended or adjusted under 35 U.S.C. 154(b) by 191 days.

(21) Appl. No.: 10/732,239

(22) Filed: Dec. 11, 2003

(65) Prior Publication Data

US 2004/0121156 A1 Jun. 24, 2004

Related U.S. Application Data

(60) Provisional application No. 60/433,957, filed on Dec. 18, 2002.

(51) Int. Cl.
*B32B 5/16* (2006.01)

(52) U.S. Cl. ........................... 428/407; 428/331

(58) Field of Classification Search ................ 428/403, 428/407, 323, 331; 427/215, 221
See application file for complete search history.

(56) References Cited

U.S. PATENT DOCUMENTS

| | | | |
|---|---|---|---|
| 2,870,108 A | 1/1959 | Nickerson | |
| 3,037,933 A | 6/1962 | Wright | |
| 4,150,101 A * | 4/1979 | Schmidt et al. | 423/338 |
| 5,028,482 A * | 7/1991 | Jeffs | 428/323 |
| 5,034,207 A | 7/1991 | Kerner et al. | |
| 5,196,267 A * | 3/1993 | Barder et al. | 428/404 |
| 5,266,610 A * | 11/1993 | Malhotra et al. | 523/201 |
| 5,342,597 A * | 8/1994 | Tunison, III | 423/335 |
| 5,426,136 A * | 6/1995 | Waddell et al. | 523/200 |
| 5,620,773 A * | 4/1997 | Nash | 428/145 |
| 5,750,258 A * | 5/1998 | Sakai et al. | 428/405 |
| 5,843,525 A * | 12/1998 | Shibasaki et al. | 427/214 |
| 6,103,004 A * | 8/2000 | Belligoi et al. | 106/482 |
| 6,432,535 B1 * | 8/2002 | Noguchi et al. | 428/403 |
| 6,509,062 B2 * | 1/2003 | Nakata et al. | 427/340 |
| 6,534,176 B2 * | 3/2003 | Terase et al. | 428/403 |
| 2002/0077388 A1 * | 6/2002 | Meyer et al. | 523/216 |

FOREIGN PATENT DOCUMENTS

| | | | |
|---|---|---|---|
| EP | 497530 A | * | 5/1992 |
| EP | 95/31508 A1 | | 11/1995 |
| EP | 0 808 880 A | | 11/1997 |
| EP | 1 199 336 A | | 4/2002 |
| WO | WO93/08236 | * | 4/1993 |
| WO | WO93/08236 A1 | | 4/1993 |

OTHER PUBLICATIONS

Brydson, "Selected Functional Polymers", Plastics Materials, 7th Edition, 1999 Elsevier, pp. 874-880.*

* cited by examiner

*Primary Examiner*—H. T Le
(74) *Attorney, Agent, or Firm*—Venable LLP; Thomas G. Wiseman

(57) ABSTRACT

Texture-coated silica can be prepared by spraying a fumed silica with water and a coating agent, for example a thermoplastic elastomer, while mixing in a suitable mixing vessel, then milling and subsequently drying the mixture.

The texture-coated silica can be used as a delustering agent in lacquers and for improving the soft feel.

12 Claims, No Drawings

TEXTURE-COATED SILICA

This application claims the benefit of U.S. Provisional Application No. 60/433,957 filed Dec. 18, 2002.

The invention relates to a texture-coated silica, to a process for its preparation and to its use.

An aerogel-like textured silica is known from DE 24 14 478. That silica is prepared by incorporating water, with uniform distribution, into an air-dispersed fumed silica and drying the resulting pulverulent mixture.

That silica has the disadvantage that it has a pronounced tendency to sedimentation and can be re-dispersed only with difficulty or not at all.

Document DE 15 92 863 describes organically modified precipitated silicas which are coated, for example, with a wax and can be used as delustering agents.

Those known silicas exhibit poor transparency in various lacquer systems. Owing to their high moisture content, those silicas cannot be used in moisture-curing polyurethane systems. Lacquer systems that cannot readily be delustered, such as polyurethane and epoxy lacquer systems, cannot be delustered satisfactorily using the known silicas.

The object is, therefore, to prepare a silica that does not exhibit those disadvantages.

The invention provides a texture-coated silica. In a preferred embodiment of the invention, the texture-coated silica can have a carbon content of from 1 to 30 wt. %.

The silica according to the invention can have a BET surface area of from 80 to 450 $m^2/g$. It can have a tamped density of from 10 to 100 g/l. The DBP number can be from 200 to 150.

A 4% aqueous suspension of the silica according to the invention can have a pH value of from 6 to 8.

Texture-coated means that the end product is more highly textured than the starting product and is additionally coated. The texture-coated silica has a higher DPB number than the starting silica.

The texture-coated silica according to the invention can be prepared by spraying a fumed silica with water and a coating agent while mixing in a suitable mixing vessel, then milling and subsequently drying the mixture.

Any known fumed silica can be used as the fumed silica.

In a preferred embodiment of the invention, the fumed silicas according to Table 1 can be used.

Fumed silica are known from Ullmann's Encyklopädie der technischen Chemie 4th Edition, Volume 21, pages 464 ff (1982).

They are prepared by means of flame hydrolysis, in which a vaporizable metal compound or metalloid compound, such as, for example, silicon tetrachloride, are burnt in a flame with gases containing hydrogen and oxygen.

TABLE 1

Physicochemical data for AEROSIL

| Test method | | AEROSIL 90 | AEROSIL 130 | AEROSIL 150 | AEROSIL 200 | AEROSIL 300 | AEROSIL 380 | AEROSIL OX 50 | AEROSIL TT 600 |
|---|---|---|---|---|---|---|---|---|---|
| Behaviour towards water | | | | | hydrophilic | | | | |
| Appearance | | | | | loose white powder | | | | |
| BET surface area[1] | $m^2/g$ | 90 ± 15 | 130 ± 25 | 150 ± 15 | 200 ± 25 | 300 ± 30 | 380 ± 30 | 50 ± 15 | 200 ± 50 |
| Average primary particle size | nm | 20 | 16 | 14 | 12 | 7 | 7 | 40 | 40 |
| Tamped density approx. value[2] | g/l | 80 | 50 | 50 | 50 | 50 | 50 | 130 | 60 |
| compressed product (added "V") | g/l | 120 | 120 | 120 50/75 | 120 50/75 | 120 50/75 | 120 | | |
| VV product (added "VV")[12] | g/l | | | | 120 | 120 | | | |
| Loss on drying[3] (2 hours at 105° C.) on leaving the supplier | % | <1.0 | <1.5 | <0.5[9] | <1.5 | <1.5 | <2.0 | <1.5 | <2.5 |
| Ignition loss[4] [7] (2 hours at 1000° C.) | % | <1 | <1 | <1 | <1 | <2 | <2.5 | <1 | <2.5 |
| pH value[5] | | 3.7-4.7 | 3.7-4.7 | 3.7-4.7 | 3.7-4.7 | 3.7-4.7 | 3.7-4.7 | 3.8-4.8 | 3.6-4.5 |
| $SiO_2$[8] | % | >99.8 | >99.8 | >99.8 | >99.8 | >99.8 | >99.8 | >99.8 | >99.8 |
| $Al_2O_3$[8] | % | <0.05 | <0.05 | <0.05 | <0.05 | <0.05 | <0.05 | <0.08 | <0.05 |
| $Fe_2O_3$[8] | % | <0.003 | <0.003 | <0.003 | <0.003 | <0.003 | <0.003 | <0.01 | <0.003 |
| $TiO_2$[8] | % | <0.03 | <0.03 | <0.03 | <0.03 | <0.03 | <0.03 | <0.03 | <0.03 |
| HCl[8] [10] | % | <0.025 | <0.025 | <0.025 | <0.025 | <0.025 | <0.025 | <0.025 | <0.025 |
| Sieve residue[8] (according to Mocker, 45 μm) | % | <0.05 | <0.05 | <0.05 | <0.05 | <0.05 | <0.05 | <0.2 | <0.05 |

TABLE 1-continued

Physicochemical data for AEROSIL

| Test method | | AEROSIL 90 | AEROSIL 130 | AEROSIL 150 | AEROSIL 200 | AEROSIL 300 | AEROSIL 380 | AEROSIL OX 50 | AEROSIL TT 600 |
|---|---|---|---|---|---|---|---|---|---|
| Drum size (net)[11] | kg | 10 | 10 | 10 | 10 | 10 | 10 | 10 | 10 |

[1] following DIN 66131
[2] following DIN ISO 787/XI, JIS K 5101/18 (not screened)
[3] following DIN ISO 787/II, ASTM D 280. JIS K 5101/21
[4] following DIN 55921, ASTM D 1208, JIS K 5101/23
[5] following DIN ISO 787/IX, ASTM D 1208, JIS K 5101/24
[6] following DIN ISO 787/XVIII, JIS K 5101/20
[7] based on material dried for 2 hours at 105° C.
[8] based on material ignited for 2 hours at 1000° C.
[9] special packaging that protects from moisture
[10] HCI content is a constituent of the ignition loss
[11] V product is supplied in 20 kg bags
[12] VV product is at present supplied only from the Rheinfelden factory Of the fumed silicas listed in Table 1, there can preferably be used all types of Aerosil with the exception of AEROSIL OX50, including the uncompressed variants.

Thermoplastic elastomers can be used as the coating agent. The thermoplastic elastomers can be used in the form of aqueous and/or solvent-containing dispersions.

Particular preference is given to the use, as thermoplastic elastomers, of dimethylpolysiloxane elastomers having terminal epoxy groups, especially having a molecular weight of greater than 100,000.

The thermoplastic elastomers can be prepared by:
(I) mixing
(A) a Theologically stable polyamide resin having a melting point or glass transition temperature of 25.degree. C. to 275.degree. C.,
(B) a silicone base comprising
(B') 100 parts by weight of a diorganopolysiloxane gum having a plasticity of at least 30 and having an average of at least 2 alkenyl groups in its molecule and
(B") 5 to 200 parts by weight of a reinforcing filler, the weight ratio of said silicone base to said polyamide resin being greater than 35:65 to 85:15,
(C) for each 100 parts by weight of said polyamide resin, a compatibilizer selected from
  (i) 0.1 to 5 parts by weight of a coupling agent having a molecular weight of less than 800 which contains at least two groups independently selected from ethylenically unsaturated group, epoxy, anhydride, silanol, carboxyl, oxazoline or alkoxy having 1 to 20 carbon atoms, in its molecule,
  (ii) 0.1 to 10 parts by weight of a functional diorganopolysiloxane having at least one group selected from epoxy, anhydride, silanol, carboxyl, amine, oxazoline or alkoxy having 1 to 20 carbon atoms, in its molecule, or
  (iii) from 0.1 to 10 parts by weight of a copolymer comprising at least one diorganopolysiloxane block and at least one block selected from polyamide, polyether, polyurethane, polyurea, polycarbonate or polyacrylate,
(D) an organohydrido silicon compound which contains an average of at least 2 silicon-bonded hydrogen groups in its molecule and
(E) a hydrosilation catalyst, components (D) and (E) being present in an amount sufficient to cure said diorganopolysiloxane (B'); and (II) dynamically curing said diorganopolysiloxane (B'). The invention further relates to a thermoplastic elastomer which is prepared by the above method.

Component (A) of the present invention is a thermoplastic polyamide resin. These resins are well known by the generic term "nylon" and are long chain synthetic polymers containing amide (i.e., —C(O)—NH—) linkages along the main polymer chain. For the purposes of the present invention, the polyamide resin has a melt point (m.p.), or glass transition temperature ($T_g$) if the polyamide is amorphous, of room temperature (i.e., 25° C.) to 275° C. Attempts to prepare TPSiV elastomers from polyamides having higher melt points (e.g., nylon 4/6) resulted in poor physical properties, the ultimate elongation of such products being less than the required 25% according to the present invention. Furthermore, for the purposes of the present invention, the polyamide resin is preferably dried by passing a dry, inert gas over resin pellets or powder at elevated temperatures. The degree of drying consistent with acceptable properties and processing depends on the particular polyamide and its value is generally recommended by the manufacturer or may be determined by a few simple experiments. It is generally preferred that the polyamide resin contains no more than about 0.1 weight percent of moisture. Finally, the polyamide must also be rheologically stable under the mixing conditions required to prepare the TPSiV elastomer, as described infra. This stability is evaluated on the neat resin at the appropriate processing temperature and a change of more than 20% in melt viscosity (mixing torque) within the time generally required to prepare the corresponding TPSiVs (e.g., 10 to 30 minutes in a bowl mixer) indicates that the resin is outside the scope of the present invention. Thus, for example, a dried nylon 11 sample having a m.p. of 198° C. was mixed in a bowl mixer under a nitrogen gas purge at about 210 to 220° C. for about 15 minutes and the observed mixing torque increased by approximately 200%. Such a polyamide resin is not a suitable candidate for the instant method.

Other than the above mentioned limitations, resin (A) can be any thermoplastic crystalline or amorphous high molecular weight solid homopolymer, copolymer or terpolymer having recurring amide units within the polymer chain. In copolymer and terpolymer systems, more than 50 mole percent of the repeat units are amide-containing units. Examples of suitable polyamides are polylactams such as nylon 6, polyenantholactam (nylon 7), polycapryllactam (nylon 8), polylauryllactam (nylon 12), and the like; homopolymers of aminoacids such as polypyrrolidinone (nylon 4); copolyamides of dicarboxylic acid and diamine such as nylon 6/6, polyhexamethyleneazelamide (nylon 6/9), polyhexamethylene-sebacamide (nylon 6/10), polyhexamethyleneisophthalamide (nylon 6,I), polyhexamethylenedodecanoic acid (nylon 6/12) and the like; aromatic and partially aromatic polyamides; copolyamides such as copolymers of caprolactam and hexamethyleneadipamide (nylon 6,6/6), or a terpolyamide (e.g., nylon 6,6/6,6); block copolymers such as polyether polyamides; or mixtures thereof. Preferred polyamide resins are nylon 6, nylon 12, nylon 6/12 and nylon 6/6.

Silicone base (B) is a uniform blend of a diorganopolysiloxane gum (B') and a reinforcing filler (B").

Diorganopolysiloxane (B') is a high consistency (gum) polymer or copolymer which contains at least 2 alkenyl groups having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, of course, that these groups are selected such that the diorganopolysiloxane gum (B') has a glass temperature (or melt point) which is below room temperature and the gum is therefore elastomeric. Methyl preferably makes up at least 50, more preferably at least 90, mole percent of the non-unsaturated silicon-bonded organic groups in component (B').

Thus, polydiorganosiloxane (B') can be a homopolymer or a copolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific illustrations of organopolysiloxane (B') include: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component (B') may also consist of combinations of two or more organopolysiloxanes. Most preferably, component (B') is a polydimethylsiloxane homopolymer which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters.times.100 of a cylindrical test specimen 2 $cm^3$ in volume and approximately 10 mm in height after the specimen has been subjected to a compressive load of 49 Newtons for three minutes at 25° C.

When the plasticity of this component is less than about 30, as in the case of the low viscosity fluid siloxanes employed by Arkles, cited supra, the TPSiVs prepared by dynamic vulcanization according to the instant method exhibit poor uniformity such that at high silicone contents (e.g., 50 to 70 weight percent) there are regions of essentially only silicone and those of essentially only thermoplastic resin, and the blends are weak and friable. The gums of the present invention are considerably more viscous than the silicone fluids employed in the prior art. For example, silicones contemplated by Arkles, cited supra, have an upper viscosity limit of 100,000 cS (0.1 $m^2/s$) and, although the plasticity of fluids of such low viscosity are not readily measured by the ASTM D 926 procedure, it was determined that this corresponds to a plasticity of approximately 24. Although there is no absolute upper limit on the plasticity of component (B'), practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Component (B") is a finely divided filler which is known to reinforce diorganopolysiloxane (B') and is preferably selected from finely divided, heat stable minerals such as fumed and precipitated forms of silica, silica aerogels and titanium dioxide having a specific surface area of at least about 50 $m^2$/gram.

The fumed form of silica is a preferred reinforcing filler based on its high surface area, which can be up to 450 $m^2$/gram and a fumed silica having a surface area of 50 to 400 $m^2/g$, most preferably 200 to 380 $m^2/g$, is highly preferred. Preferably, the fumed silica filler is treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane having an average degree of polymerization (DP) of 2 to about 100, more preferably about 2 to about 10 and it is used at a level of about 5 to 50 parts by weight for each 100 parts by weight of the silica filler. When component (B') is the preferred vinyl-functional or hexenyl-functional polydimethylsiloxane, this treating agent is preferably a hydroxy-terminated polydimethylsiloxane.

For the purposes of the present invention, 5 to 200 parts by weight, preferably 5 to 150 and most preferably 20 to 100 parts by weight, of the reinforcing filler (B") are uniformly blended with 100 parts by weight of gum (B') to prepare silicone base (B). This blending is typically carried out at room temperature using a two-roll mill, internal mixer or other suitable device, as well known in the silicone rubber art. Alternatively, the silicone base can be formed in-situ during mixing prior to dynamic vulcanization of the gum, as further described infra. In the latter case, the temperature of mixing is kept below the softening point or melting point of the polyamide resin until the reinforcing filler is well dispersed in the diorganopolysiloxane gum.

The compatibilizer (C) may be a coupling agent, an organofunctional diorganopolysiloxane or a siloxane copolymer. For the purposes of the present invention, at least one compatibilizer is included in the preparation of the thermoplastic elastomer.

In one embodiment, the compatibilizer is (i) a coupling agent having a molecular weight of less than 800 which contains at least two groups in its molecule which are independently selected from ethylenically unsaturated groups (e.g., vinyl, allyl, butenyl, pentenyl, hexenyl, acrylate and methacrylate), epoxy, anhydride, silanol, hydroxyl, alkoxy having 1 to 20, preferably from 1 to 10, more preferably from 1 to 4, carbon atoms, carboxyl or oxazoline. The latter group has the structure

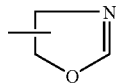

wherein the carbon atoms of the ring may contain one or more substituents selected from hydrocarbon groups having 1 to 4 carbon atoms. The coupling agent can have an organic or siloxane-based skeletal structure as long as it contains at least two of the above mentioned groups, these being located at terminal positions, along the backbone or both. In the case of siloxane backbones, the above mentioned functional organic groups (i.e., non-silanol) are attached to silicon atoms via Si—C bonds (e.g., through a divalent hydrocarbon group such as trimethylene, tetramethylene and dimethylene) or a divalent organic group containing oxygen and/or nitrogen heteroatoms, such as ester, ether or amide. Although the groups may be the same, it is generally preferred that at least one of these is an ethylenically unsaturated group, preferably vinyl, while at least one other group is selected from the above mentioned epoxy, anhydride, alkoxy, silanol, hydroxyl, carboxyl or oxazoline groups.

Examples of suitable coupling agents include allyl glycidyl ether, glycidyl methacrylate, 1,2-epoxy-7-octene, 1,2-epoxy-9-decene, 1,2-epoxy-5-hexene, allyl succinic anhydride, vinyloxazolines, vinyloxazoline derivatives such as 2-isopropenyl-2-oxazoline, gamma-glycidoxypropylmethyldimethoxysilane, gammaglycidoxypyltrimethoxysilane, beta-(3,4-epoxycyclohexyl)ethyltrimethoxysilane, 1,3-phenylene-bis (2-oxazoline), poly(propylene glycol)diglycidyl ether, diglycidyl ether of bisphenol A, tris(2,3-epoxypropy) isocyanurate and unsaturated diamides such as $CH_2=CH-(CH_2)_8-CO-NH-(CH_2)_6-NH-CO-(CH_2)_8-CH=CH_2$, inter alia.

The concentration of these coupling agents can be from 0.1 to 5 parts by weight for each 100 parts by weight of the polyamide (A), preferably, from 0.2 to 3 parts by weight.

In another embodiment, the compatibilizer is (ii) a functional diorganopolysiloxane having a number average molecular weight of at least 800, preferably 800 to 50,000, more preferably from 800 to 15,000. The functional diorganopolysiloxane (ii) is a polymer or copolymer in which the organic groups are independently selected from hydrocarbon or halogenated hydrocarbon groups which contain no aliphatic unsaturation, as described above for component (B'), including preferred embodiments thereof. However, at least one functional group selected from epoxy, anhydride, silanol, alkoxy having 1 to 20, preferably from 1 to 10, more preferably from 1 to 4, carbon atoms, amine, carboxyl or oxazoline, as described above, must be present in this polymer or copolymer.

Examples of suitable component (ii) include epoxy-functional polydimethylsiloxanes, such as mono (2,3-epoxy) propylether-terminated polydimethylsiloxane, epoxypropoxypropyl-terminated polydimethylsiloxane, (epoxycyclohexylethyl)methylsiloxane-dimethylsiloxane copolymers, and (epoxypropoxypropyl)methylsiloxane-dimethylsiloxane copolymers; amine-functional polydimethylsiloxanes, such as aminopropyl-terminated polydimethylsiloxane, aminoethylaminopropyl-terminated polydimethylsiloxane, aminopropyl-grafted polydimethylsiloxane, aminoethylaminopropyl-grafted polydimethylsiloxane; polydimethylsiloxanes containing anhydride groups, such as succinic anhydride-terminated polydimethylsiloxane and succinic anhydride-grafted polydimethylsiloxane; silanol-terminated polydimethylsiloxanes; polydimethylsiloxanes containing carboxyl groups, such as (mono)carboxydecyl-terminated polydimethylsiloxane and carboxydecyl-terminated polydimethylsiloxane; and polydimethylsiloxanes containing oxazoline groups, such as vinylxoazoline grafted polydimethylsiloxane.

The concentration of the functional diorganopolysiloxane can be from 0.5 to 10 parts by weight for each 100 parts by weight of the polyamide (A), preferably, from 0.5 to 5 parts by weight.

In the case of compatibilizers (i) and (ii), it is sometimes preferred to mix the compatibilizer with the polyamide resin at a temperature above the melt point of the resin prior to addition of the silicone base. While not wishing to be held to any theory or mechanism, it is believed that this procedure results in a reaction between the functional groups of the compatibilizer and either the amide or end groups of the resin, thereby maximizing compatibilization efficiency. Alternatively, it is sometimes advantageous to add the compatibilizer to a mixture of the polyamide and the silicone base. In any event, the preferred technique can be readily determined by routine experimentation.

In yet another embodiment, the compatibilizer is (iii) a block or graft copolymer comprising at least one diorganopolysiloxane block and at least one block selected from polyamide, polyether, polyurethane, polyurea, polycarbonate or polyacrylate. For example, copolymer (iii) can have a structure such as AB, (AB)$_n$, ABA, BAB, A-g-B and B-g-A, wherein n is an integer having a value greater than 1, A represents a diorganopolysiloxane block and B represents one of the above mentioned organic blocks. The diorganopolysiloxane block is a polymer or copolymer in which all of the organic groups are independently selected from hydrocarbon or halogenated hydrocarbon groups which contain no aliphatic unsaturation, these groups being previously described in connection with component (B'). Thus, for example, this component can be selected from diorganopolysiloxane-polyether block or graft copolymers, diorganopolysiloxane-polyamide block or graft copolymers, diorganopolysiloxane-polyurethane block or graft copolymers, diorganopolysiloxane-polyurea block or graft copolymers, diorganopolysiloxane-polycarbonate block or graft copolymers, diorganopolysiloxane-polyacrylate block or graft copolymers or diorganopolysiloxane-polymethacrylate block or graft copolymers, wherein the diorganopolysiloxane is preferably a polydimethylsiloxane block. It is preferred that the number average molecular weight of copolymer (iii) is 1,500 to 50,000, more preferably 2,000 to 20,000.

Examples of copolymer (iii) include polyamide-polydimethylsiloxane copolymers, such as the siloxane-based polyamides prepared by reacting an SiH-functional dimethylsiloxane and a reaction product of an olefinic acid with a diamine (as described in U.S. Pat. No. 5,981,680 to Petroff et al.); copolymers prepared by reacting α,ω-bis(aminoalkyl)polydimethylsiloxane and hydroxy-terminated polyamide prepolymers having a molecular weight of 1,500 to 3,000; copolymers prepared by reacting α,ω-bis(aminoalkyl)-functional polydimethylsiloxane and aromatic, aliphatic or cycloaliphatic diisocyanates having an average molecular weight of, e.g., 1,500 to 3,000; and copolymers of poly(alkylene oxide) and polydimethylsiloxane, such as poly(ethylene oxide)-polydimethylsiloxane-poly(ethylene oxide) block copolymers and poly(propylene oxide)-polydimethylsiloxane-poly(propylene oxide) block copolymers, as well as graft copolymers of such systems.

The concentration of these copolymers can be from 0.5 to 10 parts by weight for each 100 parts by weight of polyamide (A), preferably from 0.5 to 5 parts by weight.

The organohydrido silicon compound (D) is a crosslinker (cure agent) for diorganopolysiloxane (B') of the present composition and is an organopolysiloxane which contains at least 2 silicon-bonded hydrogen atoms in each molecule, but having at least about 0.1 weight percent hydrogen, preferably 0.2 to 2 and most preferably 0.5 to 1.7, percent hydrogen bonded to silicon. Those skilled in the art will, of course, appreciate that either component (B') or component (D), or both, must have a functionality greater than 2 if diorganopolysiloxane (B') is to be cured (i.e., the sum of these functionalities must be greater than 4 on average). The position of the silicon-bonded hydrogen in component (D) is not critical, and it may be bonded at the molecular chain terminals, in non-terminal positions along the molecular chain or at both positions. The silicon-bonded organic groups of component (D) are independently selected from any of the (non-alkenyl) hydrocarbon or halogenated hydrocarbon groups described above in connection with diorganopolysiloxane (B'), including preferred embodiments thereof. The molecular structure of component (D) is also not critical and is exemplified by straight-chain, partially branched straight-chain, branched, cyclic and network structures, linear polymers or copolymers being preferred, this component should be compatible with diorganopolysiloxane (B') (i.e., it is effective in curing component (B')).

Component (D) is exemplified by the following:
low molecular siloxanes, such as PhSi(OsiMe$_2$H)$_3$;
trimethylsiloxy-endblocked methylhydridopolysiloxanes;
trimethylsiloxy-endblocked dimethylsiloxane-methylhydridosiloxane copolymers;
dimethylhydridosiloxy-endblocked dimethylpolysiloxanes;
dimethylhydrogensiloxy-endblocked methylhydrogenpolysiloxanes;
dimethylhydridosiloxy-endblocked dimethylsiloxane-methylhydridosiloxane copolymers;
cyclic methylhydrogenpolysiloxanes;
cyclic dimethylsiloxane-methylhydridosiloxane copolymers;
tetrakis(dimethylhydrogensiloxy)silane;
silicone resins composed of $(CH_3)_2HSiO_{1/2}$, $(CH_3)_3SiO_{1/2}$, and $SiO_{4/2}$ units; and
silicone resins composed of $(CH_3)_2 HsiO_{1/2}$, $(CH_3)_3 SiO_{1/2}$, $CH_3Si_{03/2}$, $PhSiO_{3/2}$ and $SiO_{4/2}$ units, wherein Me and Ph hereinafter denote methyl and phenyl groups, respectively.

Particularly preferred organohydrido silicon compounds are polymers or copolymers comprising RHSiO units ended with either $R_3SiO_{1/2}$ or $HR_2SiO_{1/2}$, wherein R is independently selected from alkyl groups having 1 to 20 carbon atoms, phenyl or trifluoropropyl, preferably methyl. It is also preferred that the viscosity of component (D) is about 0.5 to 1,000 mPa-s at 25° C., preferably 2 to 500 mPa-s. Further, this component preferably has 0.5 to 1.7 weight percent hydrogen bonded to silicon. It is highly preferred that component (D) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa-s at 25.degree. C. It is understood that such a highly preferred system will have terminal groups selected from trimethylsiloxy or dimethylhdridosiloxy groups.

Component (D) may also be a combination of two or more of the above described systems. The organohydrido silicon compound (D) is used at a level such that the molar ratio of SiH therein to Si-alkenyl in component (B') is greater than 1 and preferably below about 50, more preferably 3 to 30, most preferably 4 to 20.

These SiH-functional materials are well known in the art and many of them are commercially available.

Hydrosilation catalyst (E) is a catalyst that accelerates the cure of diorganopolysiloxane (B') in the present composition. This hydrosilation catalyst is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (E) is preferably a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No.

5,175,325 to Brown et al. Most preferably, catalyst (E) is a neutralized complex of platinous chloride and divinyltetramethyldisiloxane.

Component (E) is added to the present composition in a catalytic quantity sufficient to promote the reaction of components (B') and (D) and thereby cure the diorganopolysiloxane to form an elastomer. The catalyst is preferably added so as to provide about 0.1 to 500 parts per million (ppm) of metal atoms based on the total weight of the thermoplastic elastomer composition, more preferably 0.25 to 100 ppm.

In preferred embodiments of the present invention, a hindered phenol (F) is included in the formulation. This optional component is an organic compound having at least one group of the structure

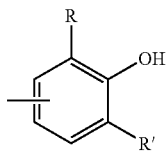

in its molecule. In the above formula, R is an alkyl group having one to four carbon atoms and R' is a hydrocarbon group having four to eight carbon atoms. For the purposes of the present invention, a group according to formula (i) can be attached to hydrogen to form a 1,5-di-organophenol. Preferably, one to four of these groups are attached to an organic moiety of corresponding valence such that the contemplated compound has a molecular weight (MW) of less than about 1,500. Most preferably, four such groups are present in component (F) and this compound has a molecular weight of less than 1,200. This monovalent (or polyvalent) organic moiety can contain heteroatoms such as oxygen, nitrogen, phosphorous and sulfur. The R' groups in the above formula may be illustrated by t-butyl, n-pentyl, butenyl, hexenyl, cyclopentyl, cyclohexyl and phenyl. It is preferred that both R and R' are t-butyl.

Non-limiting specific examples of component (F) include various hindered phenols marketed by Ciba Specialty Chemicals Corporation under the trade name Irganox™:

Irganox™ 1076=octadecyl 3,5-di-tert-butyl-4-hydroxyhydrocinnamate,

Irganox™ 1035=thiodiethylene bis(3,5-di-tert-butyl-4-hydroxyhydrocinnamate),

Irganox™ MD1024=1,2-bis(3,5-di-tert-butyl-4-hydroxyhydrocinnamoyl)hydrazine,

Irganox™ 1330=1,3,5-trimethyl-2,4,6-tris(3,5-di-tert-butyl-4-hydroxybenzyl)benzene, Irganox™ 1425 WL=calcium bis(monoethyl(3,5-di-tert-butyl-4-hydroxybenzyl)phosphonate) and Irganox™ 3114=1,3,5-tris-(3,5-di-tert-butyl-4-hydroxybenzyl)-1,3,5-triazine-2,4,6(1H,3H,5H)-trione.

Preferred hindered phenols are Irganox™ 245 {triethyleneglycol bis(3-(3'-tert-butyl-4'-hydroxy-5'-methylphenyl) propionate)}, Irganox™1098 {N,N'-hexamethylenebis (3,5-di-tert-butyl-4-hydroxyhydrocinnamamide)} and Irganox™ 1010 {tetrakis(methylene(3,5-di-tert-butyl-4-hydroxy-hydrocinnamate))methane}.

From 0.1 to 5 parts by weight of hindered phenol (F) are preferably employed for each 100 parts by weight of polyamide (A) plus silicone base (B). Preferably 0.1 to 0.75 parts by weight, more preferably 0.475 to 0.525 parts by weight, of (F) are added for each 100 parts by weight of (A) plus (B).

In addition to the above-mentioned components, a minor amount of an optional additive (G) can be incorporated in the compositions of the present invention. Preferably, this optional component is added at a level of 0.5 to 40 weight percent based on the total composition, more preferably 0.5 to 20 weight percent. This optional additive can be illustrated by, but not limited to, reinforcing fillers for polyamide resins, such as glass fibers and carbon fibers; extending fillers, such as quartz, barium sulfate, calcium carbonate, and diatomaceous earth; pigments, such as iron oxide and titanium oxide; electrically conducting fillers, such as carbon black and finely divided metals; heat stabilizers, such as hydrated cerric oxide; antioxidants; flame retardants, such as halogenated hydrocarbons, alumina trihydrate, magnesium hydroxide and organophosphorous compounds; and other fire retardant (FR) materials. A preferred FR additive is calcium silicate particulate, preferably a wollastonite having an average particle size of 2 to 30 µm. Further, optional component (G) can be a plasticizers for the silicone gum component, such as polydimethylsiloxane oil, and/or a plasticizer for the polyamide component. Examples of the latter include phthalate esters such as dicyclohexyl phthalate, dimethyl phthalate, dioctyl phthalate, butyl benzyl phthalate and benzyl phthalate; trimellitate esters such as $C_1$-$C_9$ alkyl trimellitate; sulfonamides such as N-cyclohexyl-p-toluenesulfonamide, N-ethyl-o,p-toluenesulfonamide and o-toluenesulfonamide, and liquid oligomeric plasticizers. Preferred plasticizers are liquids of low volatility which minimize emissions of plasticizer at the common melt temperatures of polyamides.

The above additives are typically added to the final thermoplastic composition after dynamic cure, but they may also be added at any point in the preparation provided they do not interfere with the dynamic vulcanization mechanism. Of course, the above additional ingredients are only used at levels which do not significantly detract from the desired properties of the final composition.

According to the method of the present invention, the thermoplastic elastomer is prepared by thoroughly dispersing silicone base (B) and compatibilizer (C) in polyamide (A) and dynamically vulcanizing the diorganopolysiloxane in the base using organohydrido silicon compound (D) and catalyst (E). For the purposes of the present invention, the weight ratio of silicone base (B) to polyamide resin (A) is greater than 35:65. It has been found that when this ratio is 35:65 or less, the resulting vulcanizate generally has a modulus more resembling the polyamide resin than a thermoplastic elastomer. On the other hand, the above mentioned ratio should be no more than about 85:15 since the compositions tend to be weak and resemble cured silicone elastomers above this value. Notwithstanding this upper limit, the maximum ratio of (B) to (A) for any given combination of components is also limited by processability considerations since too high a silicone base content results in at least a partially crosslinked continuous phase which is no longer thermoplastic. For the purposes of the present invention, this practical limit is readily determined by routine experimentation and represents the highest level of component (B) which allows the TPSiV to be compression molded. It is, however, preferred that the final thermoplastic elastomer can also be readily processed in other conventional plastic operations, such as injection molding and extrusion and, in this case, the weight ratio of components (B) to (A) should be no more than about 75:25. Such a preferred thermoplastic elastomer which is subsequently re-processed often has a tensile strength and elongation which are within 10% of the corresponding values for the original TPSiV (i.e., the thermoplastic elastomer is little changed by re-processing). Although the amount of silicone base consistent with the above mentioned requirements depends upon the particular polyamide resin and other components selected, it is preferred that the weight ratio of components (B) to (A) is 40:60 to 75:25, more preferably 40:60 to 70:30.

Mixing is carried out in any device which is capable of uniformly dispersing the components in the polyamide resin, such as an internal mixer or a twin-screw extruder, the latter being preferred for commercial preparations. The temperature is preferably kept as low as practical consistent with good mixing so as not to degrade the resin. Depending upon the particular system, order of mixing is generally not critical and, for example, components (A), (C), (D) and, optionally, (F) can be added to (B) at a temperature above the softening point (i.e., melt point or glass temperature) of (A), catalyst (E) then being introduced to initiate dynamic vulcanization. However, components (B) through (F) should be well dispersed in resin (A) before dynamic vulcanization begins. As previously mentioned, it is also contemplated that the silicone base can be formed in-situ. For example, the reinforcing filler may be added to a mixer already containing the polyamide resin and diorganopolysiloxane gum at a temperature below the softening point of the resin to thoroughly disperse the filler in the gum. The temperature is then raised to melt the resin, the other ingredients are added and mixing/dynamic vulcanization are carried out. Optimum temperatures, mixing times and other conditions of the mixing operation depend upon the particular resin and other components under consideration and these may be determined by routine experimentation by those skilled in the art. It is, however, preferred to carry out the mixing and dynamic vulcanization under a dry, inert atmosphere (i.e., one that does not adversely react with the components or otherwise interfere with the hydrosilation cure), such as dry nitrogen, helium or argon.

As noted above, in order to be within the scope of the present invention, the tensile strength or elongation, or both, of the TPSiV elastomer must be at least 25% greater than that of a corresponding simple blend. A further requirement of the invention is that the TPSiV has at least 25% elongation, as determined by the test described infra. In this context, the term "simple blend" (or physical blend) denotes a composition wherein the weight proportions of resin (A), base (B) and compatibilizer (C) are identical to the proportions in the TPSiV, but no cure agents are employed (i.e., either component (D) or (E), or both, are omitted and the gum is therefore not cured). In order to determine if a particular composition meets the above criterion, the tensile strength of the TPSiV is measured on dumbbells having a length of 25.4 mm and a width of 3.2 mm and a typical thickness of 1 to 2 mm, according to ASTM method D 412, at an extension rate of 50 mm/min. At least three such samples are evaluated and the results averaged after removing obvious low readings due to sample inhomogeneity (e.g., such as voids, contamination or inclusions). These values are then compared to the corresponding average tensile and elongation values of a sample prepared from the simple blend composition. When at least a 25% improvement in tensile and/or elongation over the simple blend is not realized there is no benefit derived from the dynamic vulcanization and such TPSiVs are not within the scope of the present invention.

The thermoplastic elastomer prepared by the above described method can then be processed by conventional techniques, such as extrusion, vacuum forming, injection molding, blow molding, overmolding or compression molding. Moreover, these compositions can be re-processed (recycled) with little or no degradation of mechanical properties.

Because the volume of the silica decreases only slightly when the water and the coating agent are incorporated, it is to be assumed that the originally present association of the primary particles of the air-dispersed fumed silica is substantially retained. The charging with water and of the coating material probably leads to the start of dissolution of the silica surface, so that dissolved silica is present there. During the subsequent drying operation, that dissolved silica cements the primary particles to their points of contact.

Thus, by charging a fumed silica in a targeted manner with water and the coating agent and subsequently drying it, there forms a substance corresponding to Kistler's aerogels which is stable to dispersion and has a high macropore volume and a very low apparent density (bulk weight).

It has further been found that the apparent structure present before the incorporation of the water and the coating agent, determined by the packing density of the fumed silica in air, which structure is expressed by its apparent density (bulk weight), has a pronounced influence on the product obtainable by the process according to the invention: the more bulky the starting product, the more bulky the end product that is obtained.

It has proved advantageous to use fumed silica having a tamped density of from 10 to 130 g/l, preferably from 15 to 80 g/l, especially about 20 g/l, to prepare the products according to the invention.

In addition, it is found to be advantageous to choose fumed silica having a large surface area and hence small primary particles. According to an advantageous embodiment of the process according to the invention, silica having BET surface areas of from 100 to 480 $m^2/g$, especially from 250 to 410 $m^2/g$, is used.

Complete wetting of the primary particles can be achieved if only from 5 to 20 wt. %, especially from 7 to 15 wt. %, water and the coating agent are incorporated into the silica with uniform distribution. Because the water that has been incorporated has to be removed again by drying, it is desirable for economic reasons to use a minimal amount of water. However, the required amount is dependent to a certain extent on the nature of the incorporation.

The building up of the texture according to the process of the invention can be markedly promoted if compounds having a basic reaction, such as, for example, ammonia, sodium hydroxide, potassium hydroxide, water-soluble amines, water glass or the like, are added to the water and the coating agent. The amounts added are advantageously so chosen that a pH value of from 7 to 14, preferably from 8 to 12, especially from 10 to 11, is established in the water.

The alkalis used act as solubilizers for silica and bring about an increase in the macroporosity of the process products.

Instead of alkaline compounds, it is also possible to add to the water and the coating agent free silica or hydrolytic silica and/or substances that liberate alkali. Free silica, for example silica produced by acidification or ion exchange of silicate solutions or by hydrolytic cleavage of organosilicon compounds, for example of tetramethyl silicate, likewise promotes the building up of the texture. An example of a substance that liberates alkali and silica hydrolytically is sodium methylsiliconate.

Uniform distribution of the water and the coating agent in the silica can be carried out by adding them dropwise or spraying them into the silica, which is in mixing movement, at temperatures of the silica of from 20 to 100° C., preferably from 40 to 70° C., especially from 50 to 60° C. The mixing movement is advantageously effected by stirring.

A further variant of the introduction of water consists in spraying the water and the coating agent into the silica in a fluidized mass stream, for example using a down pipe.

It has also proved advantageous to carry out the charging with water at moderately elevated temperatures. This can be effected either by preheating the water that is to be incorporated with the coating agent, or by preheating the silica, or by preheating both components. For example, the water to be incorporated with the coating agent can have a temperature of from 20 to 100° C., preferably from 50 to 100° C., especially from 90 to 100° C.

The building up of the texture can also be promoted by steaming the charged silica for a short time in a closed chamber. The steaming leads to particularly good distribution of the water. It has proved advantageous to steam the silica charged with water, before it is dried, in a closed vessel for approximately from 5 to 60 minutes, preferably from 10 to 30 minutes, especially for about 20 minutes, at temperatures up to the boiling point of the water, preferably from 50 to 80° C., especially about 60° C.

A further possible method of improving the distribution of the water and of the coating agent consists in milling the silica charged with the water and the coating agent, for example in pinned disk mills or air-jet mills.

Drying is then carried out, during which the preformed texture is presumably fixed by way of the primary particles which have begun to dissolve at the surface or which are coated at the surface with free silica.

The nature of the drying is not critical.

It is possible to dry the resulting mixture of silica and water and coating agent, which phenomonologically always resembles a dry powder, in, for example, a rack drier, a disk drier, a Buttner drier, a flow drier or a microwave drier. However, it is also possible for the silica charged with water and coating agent to be milled and dried simultaneously in a steam or water-jet mill, with a separate process step thus being saved.

If separate drying of the pulverulent mixture obtained after charging with water and coating agent is carried out, it can be followed by dry milling in a pinned disk mill or an air-jet mill.

The silica according to the invention can be used as a delustering agent in lacquers, whereby it has the following advantages:
no sedimentation, or ready re-dispersibility,
the lustering efficiency is not impaired,
improvement in haptics,
possibility of more highly transparent clear lacquers,
low moisture contents, therefore can be used in moisture-curing PU systems (polyurethane systems),
better rheology, because less thixotropic.

The silica according to the invention can be used especially in polyurethane lacquers.

The invention also provides a solvent-borne coating system containing the texture-coated silica according to the invention.

The invention also provides an aqueous coating system containing the texture-coated silica according to the invention.

The invention relates also to the use of the solvent-borne and of the aqueous coating system in the coating of films, plastics, wood, etc.

The invention also provides plastics bodies having a soft-feel surface.

The soft-feel effect in particular can be improved by the use of the texture-coated silica according to the invention.

The subject-matter of the invention is therefore suitable for any objects touched by the bare skin, especially on the hands. These include especially portable telephones, cameras, computer casings (notebooks), bags, dashboards, seats, etc.

EXAMPLES

Preparation Of The Texture-Coated Silica According To The Invention

A hydrophilic fumed silica (Aerosil 300) having the following physicochemical properties is used:

| | |
|---|---|
| specific surface area according to BET [m$^2$/g]: | 290.0 |
| pH value: | 4.2 |
| tamped density [g/l]: | 35 |
| loss on drying [%]: | 0.8 |
| DBP number [%]: | 305.0 |
| C content [%]: | 0 |

The following coating agent is used:

A white, aqueous, anionic dispersion of a silicone elastomer having epoxy functions, which contains 3.0% ethanol, 1.0% methanol and has a solids content of 50%, a viscosity of about 150 mPas and a density of 1. The dispersed silicone elastomer particles have an average particle size of from 3 to 4 μm and a Shore A hardness of 70. The coating agent that is used is prepared from this dispersion by addition of water and NH$_4$OH (25%), or water and NaOH, or water and water glass.

A ploughshare mixer is used as the mixing vessel, the coating agent is applied by spraying at room temperature by means of a binary nozzle.

There is used as the silicone elastomer a suspension having the following physicochemical parameters:

| | |
|---|---|
| appearance: | white liquid |
| average particle size: | 3-4 μm |
| viscosity: | 150 mPas |
| solids content: | 50% |
| type of suspension: | anionic |
| hardness of the solid: (Shore A hardness) | 70 |

Comparison Example

For comparison purposes, water (rendered alkaline) on its own is used instead of coating agent in Example 15.

| | Preparation of the moistened material | | | | | |
|---|---|---|---|---|---|---|
| Number | Amount of silica [kg] | Amount of coating agent [kg] | Amount of water [kg] | pH value of the coating agent | pH value adjustment by addition of | Loss on drying of the moistened material |
| 1 | 2 | 0.341 | 0.372 | 10.5 | NaOH | 21.9 |
| 2 | 2 | 0.466 | 0.307 | 10.6 | water glass | 20.8 |
| 3 | 2 | 0.466 | 0.307 | 10.6 | NH$_4$OH | 20.8 |

-continued

Preparation of the moistened material

| Number | Amount of silica [kg] | Amount of coating agent [kg] | Amount of water [kg] | pH value of the coating agent | pH value adjustment by addition of | Loss on drying of the moistened material |
|---|---|---|---|---|---|---|
| 4 | 2 | 0.466 | 0.307 | 10.5 | NH4OH | 20.8 |
| 5 | 2 | 0.909 | 0.077 | 10.5 | NaOH | 15.9 |
| 6 | 2 | 0.909 | 0.077 | 10.5 | NH4OH | 15.9 |
| 7 | 2 | 0.909 | 0.077 | 10.6 | NH4OH | 17.0 |
| 8 | 2 | 0.909 | 0.077 | 10.5 | NH4OH | 17.4 |
| 9 | 2 | 0.909 | 0.077 | 10.6 | NH4OH | 17.4 |
| 10 | 2 | 0.909 | 0.077 | 10.6 | water glass | 16.8 |
| 11 | 2 | 0.638 | 0.216 | 10.8 | NaOH | 18.3 |
| 12 | 2 | 0.508 | 0.284 | 10.5 | NH4OH | 18.4 |
| 13 | 2 | 0.909 | 0.077 | 10.5 | NH4OH | 17.8 |
| 14 | 2 | 0.909 | 0.077 | 10.6 | NH4OH | 17.8 |
| 15 | 2 | — | 0.765 | 10.5 | NH4OH | 27.8 |

Milling and drying of the moistened material

| Number | Milling unit | Throughput during milling [kg/h] | Drying temperature [° C.] | Drying time [h] |
|---|---|---|---|---|
| 1 | pinned disk mill | 5 | 120 | 15 |
| 2 | pinned disk mill | 5 | 120 | 13 |
| 3 | pinned disk mill | 5 | 130 | 13 |
| 4 | pinned disk mill | 5 | 130 | 13 |
| 5 | gas-jet mill | 7 | 120 | 13 |
| 6 | gas-jet mill | 7 | 130 | 14 |
| 7 | gas-jet mill | 7 | 120 | 13 |
| 8 | gas-jet mill | 7 | 120 | 13 |
| 9 | gas-jet mill | 7 | 120 | 13 |
| 10 | pinned disk mill | 5 | 120 | 13 |
| 11 | gas-jet mill | 7 | 120 | 13 |
| 12 | gas-jet mill | 7 | 120 | 13 |
| 13 | pinned disk mill | 5 | 120 | 13 |
| 14 | pinned disk mill | 5 | 110 | 13 |
| 15 | gas-jet mill | 7 | 120 | 11 |

Physicochemical data

| Number | LD [%] | IL [%] | pH | DBP [%] | TD [g/l] | C [%] |
|---|---|---|---|---|---|---|
| 1 | 1.8 | 3.3 | 6.1 | 358 | 25 | 2.2 |
| 2 | 2.3 | 3.6 | 6.2 | 333 | 25 | 3.1 |
| 3 | 1.8 | 3.8 | 6.5 | 350 | 29 | 3.2 |
| 4 | 1.7 | 4.1 | 6.4 | 355 | 29 | 3.2 |
| 5 | 1.4 | 6.2 | 5.6 | 310 | 23 | 5.4 |
| 6 | 1.8 | 6.2 | 5.7 | 315 | 27 | 5.2 |
| 7 | 1.9 | 6.0 | 5.8 | 366 | 31 | 5.5 |
| 8 | 1.5 | 6.0 | 5.6 | 385 | 30 | 5.7 |
| 9 | 1.6 | 5.6 | 5.3 | 327 | 29 | 5.7 |
| 10 | 2.3 | 6.2 | 5.4 | 314 | 28 | 5.5 |
| 11 | 2.0 | 4.7 | 5.8 | 324 | 26 | 4.3 |
| 12 | 2.6 | 4.3 | 5.9 | 321 | 26 | 3.5 |
| 13 | 1.3 | 6.4 | 5.6 | 317 | 31 | 5.6 |
| 14 | 2.2 | 5.9 | 5.5 | 308 | 30 | 5.4 |
| 15 | 2.3 | 1.6 | 6.9 | 326 | 22 | 0 |

Preliminary experiments

| AN number | ML number | DUPLEX Grindo gloss | | Separation on washing | Discoloration |
|---|---|---|---|---|---|
| Example 1 | ML 1050 | 42 | −5.2 | no | no |
| Example 2 | ML 1050 | 40 | −0.7 | no | no |
| Example 3 | ML 1050 | 42 | −5.1 | no | no |
| Example 4 | ML 1050 | 45/70 | −9.3 | no | no |
| Example 5 | ML 1076 | 40 | 14.3 | | |
| Example 6 | ML 1076 | 41 | 10.7 | | |
| Example 7 | ML 1114 | 41 | 13.6 | no | |
| Example 8 | ML 1114 | 40 | 12.6 | no | |
| Example 9 | ML 1114 | 40 | 11.3 | no | |
| Example 10 | ML 1114 | 40 | 13.9 | no | |
| Example 11 | ML 1127 | 39 | 8.2 | | |
| Example 12 | ML 1127 | 39 | 7.9 | | |
| Example 13 | ML 1127 | 46 | 6.7 | | |
| Example 14 | ML 1127 | 41 | 10.6 | | |

In various preliminary tests it becomes clear that all products improve the haptics, all further tests being carried out on Example 5 as a representative example.

Haptics test (rating 0 = very poor to 10 = very good)

| Delustering agent | % on lacquer | Grindo | 60° gloss | Tester | Tester2 | Tester3 | Tester4 | Tester5 | Average |
|---|---|---|---|---|---|---|---|---|---|
| Soft-feel lacquer Bayer AG; recipe B; based on Bayhydrol XP 2429/Bayhydrol PR 240 | | | | | | | | | |
| ACEMATT TS100 | 4 | 38 | 1.5 | 5 | 5 | 6 | 5 | 5 | 5.2 |
| Dow Corning DY 33-450 F* | 1.8 | 20 | 54.4 | 0 | 0 | 0 | 0 | 0 | 0 |
| TS100 + DY 33-450 F* | 4 | 38 | 1.3 | 5 | 6 | 5 | 5 | 6 | 5.4 |
| Example 5 | 4 | 37 | 2.3 | 9 | 8 | 9 | 10 | 8 | 8.8 |
| Soft-feel lacquer Bayer AG; recipe E; based on Bayhydrol XP 2429/Bayhydrol PR 340 | | | | | | | | | |
| ACEMATT TS100 | 4 | 36 | 2.2 | 6 | 5 | 6 | 5 | 5 | 5.4 |
| Dow Corning DY 33-450 F* | 1.8 | 15 | 67.5 | 0 | 0 | 0 | 0 | 0 | 0 |
| TS100 + DY 33-450 F* | 4 | 36 | 2.2 | 6 | 6 | 5 | 6 | 6 | 5.8 |
| Example 5 | 4 | 36 | 3.5 | 9 | 9 | 10 | 10 | 9 | 9.4 |

*Dispersion without ammonides and water

It becomes clear from the calculated data that the soft-feel effect of the surface is markedly improved by the use of the texture-coated silica according to the invention.

Determination of the Physicochemical Parameters

BET Surface Area

The BET surface area is determined in accordance with DIN 66 131 using nitrogen.

Tamped Density

Determination of the tamped density following DIN ISO 787/XI

Fundamental Principles of the Tamped Density Determination

The tamped density (formerly tamped volume) is equal to the quotient of the weight and the volume of a powder after tamping in a tamping volumeter under defined conditions. According to DIN ISO 787/XI, the tamped density is given in $g/cm^3$. Because of the very low tamped density of the oxides, the value herein is given in g/l. Furthermore, drying and screening and repetition of the tamping operation are not carried out.

Devices for Determining the Tamped Density tamping volumeter measuring cylinder laboratory balance (readable to 0.01 g)

Carrying Out the Tamped Density Determination

200±10 ml of oxide are introduced into the measuring cylinder of the tamping volumeter in such a manner that no spaces remain and the surface is horizontal.

The weight of the introduced sample is determined to an accuracy of 0.01 g. The measuring cylinder containing the sample is placed into the measuring cylinder holder of the tamping volumeter and tamped 1250 times.

The volume of the tamped oxide is read off to an accuracy of 1 ml.

Evaluation of the Tamped Density Determination $$\text{tamped density (g/l)} = \frac{\text{g initial weight} \times 1000}{\text{ml read-off volume}}$$

pH Value

The pH value is determined in 4% aqueous dispersion, in the case of hydrophobic oxides in water:methanol 1:1.

Reagents for Determining the pH Value distilled or demineralised water, pH>5.5 methanol, p.a.

buffer solutions pH 7.00 pH 4.66

Devices for Determining the pH Value laboratory balance (readable to 0.1 g)

glass beaker, 250 ml magnetic stirrer magnetic rod, length 4 cm combined pH electrode pH meter Dispensette, 100 ml Procedure for Determining the pH Value The determination is carried out following DIN/ISO 787/IX: Calibration: Before the pH value is measured, the meter is calibrated with the buffer solutions. If several measurements are carried out in succession, it is sufficient to calibrate the meter once.

4 g of hydrophilic oxide are stirred in a 250 ml glass beaker with 96 g (96 ml) of water with the aid of a Dispensette and for five minutes by means of a magnetic stirrer (speed about 1000 $min^{-1}$) with the pH electrode immersed.

4 g of hydrophobic oxide are made into a paste with 48 g (61 ml) of methanol in a 250 ml glass beaker, and the suspension is diluted with 48 g (48 ml) of water and stirred for five minutes by means of a magnetic stirrer (speed about 1000 $min^{-1}$) with the pH electrode immersed. After the stirrer has been switched off, the pH value is read off after the mixture has been allowed to stand for one minute. The result is read off to one decimal place.

Loss on Drying

In contrast to the weighed portion of 10 g mentioned in DIN ISO 787 II, a weighed portion of 1 g is used for determining the loss on drying.

The cover is fitted before cooling is carried out. A second drying operation is not carried out.

About 1 g of the sample is weighed, to an accuracy of 0.1 mg, avoiding the formation of dust, into a weighing pan which has a ground-glass cover and has been dried at 105° C., and is dried for two hours at 105° C. in a drying cabinet. After cooling with the cover in place in a desiccator over blue gel, the sample is re-weighed.

$$\% \text{ loss on drying at } 105° \text{ C.} = \frac{\text{g loss in weight}}{\text{g initial weight}} \times 100$$

The result is read off to one decimal place.

Ignition Loss

Devices for Determining the Ignition Loss porcelain crucible with crucible lid muffle furnace analytical balance (readable to 0.1 mg)

desiccator

Carrying Out the Determination of the Ignition Loss

Departing from DIN 55 921, 0.3 to 1 g of the material, which has not been pre-dried, is weighed, to an accuracy of 0.1 mg, into a porcelain crucible, having a crucible lid, which has previously been ignited, and is ignited for 2 hours at 1000° C. in a muffle furnace.

The formation of dust is carefully to be avoided. It has proved advantageous for the weighed samples to be placed into the muffle furnace while it is still cold.

More pronounced air turbulence in the porcelain crucibles is avoided by slow heating of the furnace.

After 1000° C. has been reached, the sample is ignited further for 2 hours. The crucible is then covered with a crucible lid and the ignition loss of the crucible is determined in a desiccator over blue gel.

Evaluation of the Ignition Loss Determination

Because the ignition loss is based on the sample dried for 2 hours at 105° C., the calculation formula is as follows:

$$\% \text{ ignition loss} = \frac{m_0 \times \frac{100-LD}{100} - m_1}{m_0 \times \frac{100-LD}{100}} \times 100$$

$m_0$=initial weight (g)
LD=loss on drying (%)
$m_1$=weight of the ignited sample (g)

The result is read off to one decimal place.

DBP Number

Devices for Determining the DBP Number
top-pan balance
poly-beaker (250 ml)
Brabender plastograph with metering unit Reagent
Dibutyl phthalate (commercial grade)

Implementation
1. Checking of the switch-off point
   Switch on the plastograph without the metering pump.
   Open the flap covering the operating element (beneath the display)
   Press the "Func" button, the display alternates between the switch-off value "1000" and the alarm "AI H.A.", after 5 seconds the display returns to normal mode.
2. Calibration
   Switch on the plastograph without the metering pump.
   Switch on the kneader (press both Start buttons simultaneously).
   With the "Cal" button depressed press the "Funk" button once, the display alternates between the current zero point and "Lo S.C.".
   Press the "Cal" button again, after four seconds (calibration) the device displays the current overall range "10000" and "Fu S.C.".
   Press the "Cal" button again, after four seconds (calibration) the device shows the friction-corrected zero point "tare".
   Press the "Cal" button again and wait 5 seconds.
   Carry out the steps "Switch-off point" and "Calibration operation" once daily as required before the measurements!
3. Measurement
   12.5 g sample are weighed into a poly-beaker and placed into the kneading chamber. If instructed, a different initial weight may also be used (e.g. 8 or 20 g). The DBP metering unit is switched on. As soon as the filling procedure (display F) is complete, the plastograph is ready for operation.

The measurement begins by simultaneous pressing of the Start buttons.

The metering unit meters in 4 ml of DBP/min until the switch-off point that has been set (1000) is reached.

The device switches off automatically.

The DBP consumption can now be read off on the display of the metering device.

Calculation $$DBP\ (\%) = \frac{\text{Dosimat display} \times 1.047 \times 100}{\text{initial weight (g)}}$$

Always give the result together with the initial weight.

The invention claimed is:

1. Texture-coated fumed silica particles wherein the texture coating is provided by a thermoplastic elastomer and the texture-coated fumed silica particles exhibit a higher dibutyl phthalate (DBP) number than the initial fumed silica particles.

2. The texture-coated silica particles as claimed in claim 1, having a carbon content of from 1 to 30 wt. %.

3. The texture-coated silica particles as claimed in claim 1, having a BET surface area of from 80 to 450 m$^2$/g.

4. The texture-coated silica particles as claimed in claim 1, having a bulk weight of from 10 to 60 g/l.

5. The texture-coated silica particles as claimed in claim 1, having a DBP number of from 2.4 to 3.8.

6. In a lacquer, containing a delustering agent, wherein the improvement comprises the texture-coated silica particles as claimed in claim 1 as delustering agents.

7. A solvent-borne coating system containing a texture-coated silica particles as claimed in claim 1.

8. In a coated film, plastic and/or wood wherein the improvement comprises the coating system as claimed in claim 7.

9. An aqueous coating system containing a texture-coated silica particles as claimed in claim 1.

10. A plastics body containing the texture-coated fumed silica particles of claim 1 having a soft-feel surface.

11. A process for the preparation of a texture-coated silica, wherein the coated silica exhibits a higher DBP number than the starting silica, which process comprises spraying a fumed silica particles with water and a thermoplastic elastomer while mixing in a suitable mixing vessel, then milling and subsequently drying the mixture.

12. A texture-coated silica particles obtainable by the process according to claim 11.

* * * * *